W. H. BROWN.
LOW PRESSURE ALARM FOR PNEUMATIC TIRES.
APPLICATION FILED OCT. 25, 1919.
1,424,278.
Patented Aug. 1, 1922.
2 SHEETS—SHEET 1.
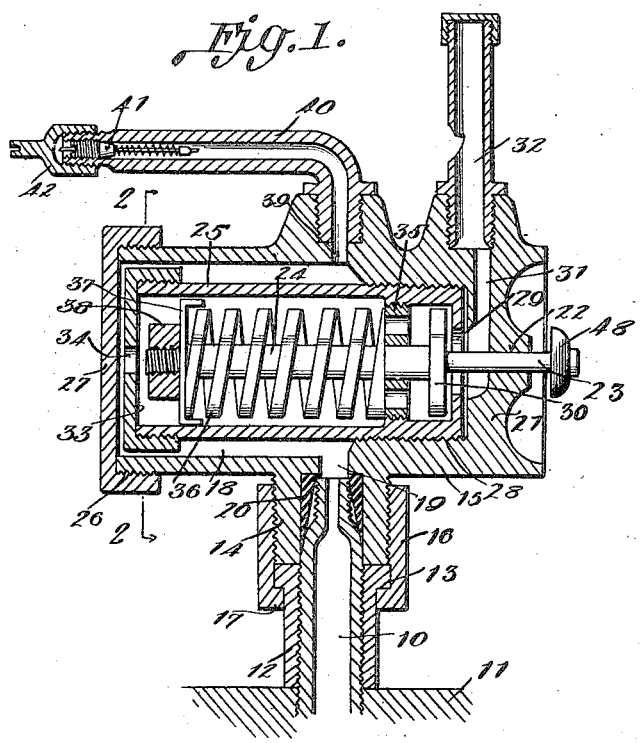
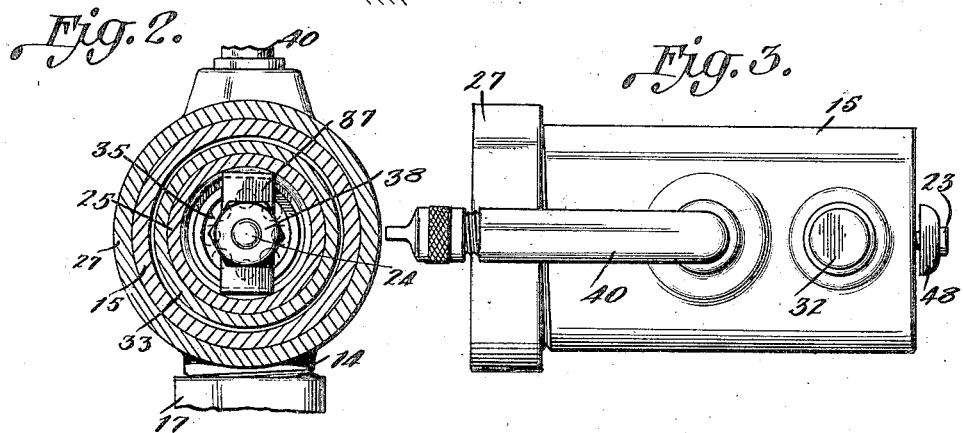
INVENTOR
Walter Henry Brown,
BY
ATTORNEYS
WITNESSES

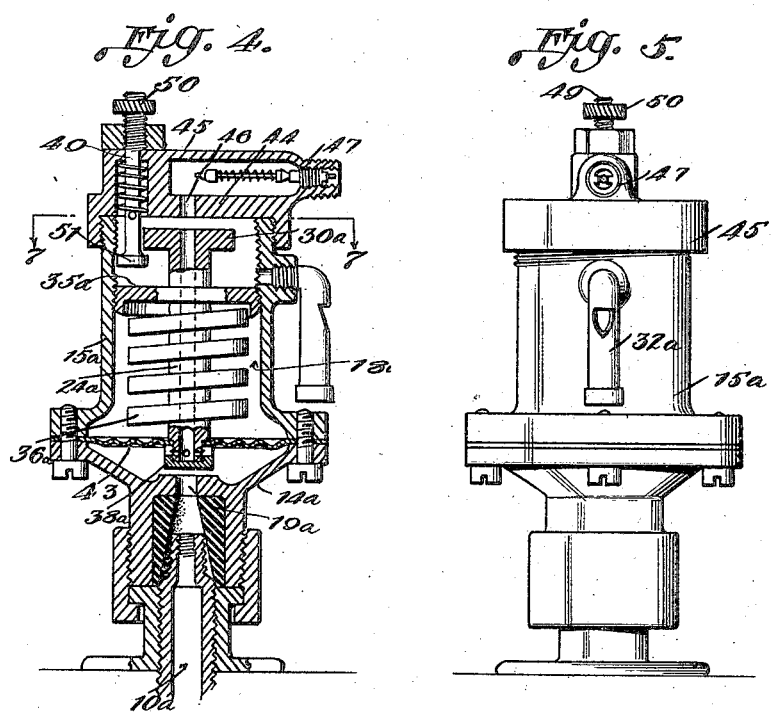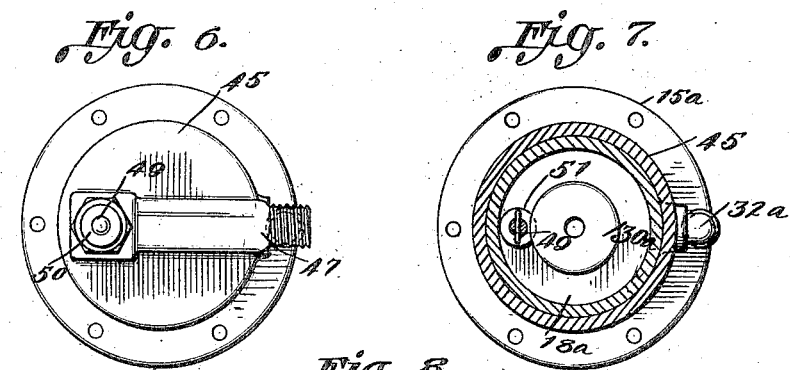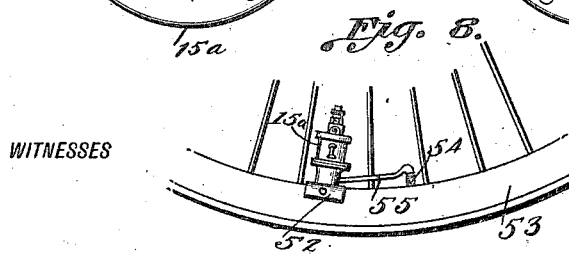

UNITED STATES PATENT OFFICE.

WALTER HENRY BROWN, OF PASADENA, CALIFORNIA.

LOW-PRESSURE ALARM FOR PNEUMATIC TIRES.

1,424,278. Specification of Letters Patent. Patented Aug. 1, 1922.

Application filed October 25, 1919. Serial No. 333,163.

*To all whom it may concern:*

Be it known that I, WALTER HENRY BROWN, a citizen of the United States, and a resident of Pasadena, in the county of Los Angeles and State of California, have invented certain new and useful Improvements in Low-Pressure Alarms for Pneumatic Tires, of which the following is a specification.

My present invention relates generally to low pressure alarms for pneumatic tires, and more particularly to a device of this nature which will in its use permit of the ordinary inflation of the tire, my primary object being the provision of an arrangement which will operate between maximum and minimum pressures in such manner as to sound an alarm continuously between these pressures and automatically act to cut off communication between the tire and the alarm member when the minimum pressure has been reached, so as to prevent further escape of air from the tire.

Further objects relating among other things to the particular mounting of my improved alarm will be better understood from the following description, referring to the accompanying drawings illustrating two structural forms of the invention so far devised, and which drawings form a part of this specification, in the drawings—

Figure 1 is a vertical longitudinal section through one form of my invention,

Figure 2 is a vertical transverse section taken substantially on the line 2—2 of Figure 1, Figure 3 is a top plan view, Figure 4 is a vertical section through a modified form, Figure 5 is a side view thereof, Figure 6 is a top plan view.

Figure 7 is a horizontal section taken substantially on the line 7—7 of Figure 4, and Figure 8 is a detail side view illustrating a modified form of my improved device, as to its mounting.

Referring now to these figures, and more particularly to Figure 1, I have shown the valve tube 10 of a pneumatic tire which projects inwardly through a wheel rim partly seen at 11 and which for the purpose of my invention is engaged by an internally threaded tubular sleeve 12 which is screwed in abutting relation against the wheel rim 11 and has an annular flange 13 at its outer end.

The outer end of the valve tube 10 is furthermore engaged by the tubular threaded extension 14 of a casing 15, a tubular nut 16 being employed around the casing extension 14 having inner threads engaging the threads on said extension and having an inturned annular flange 17 at its inner end which cooperates with flange 13 of sleeve 12. The base of the extension 14 communicates with the chamber 18 of a casing 15 through a reduced opening 19, and there is thus formed between the opening 19 and the bore of the extension 14 an annular shoulder which forms an abutment for an inner compressible gasket 20 engaging the upper externally threaded surface of the valve tube 10 and pressed into air tight relation, as the extension 14 is drawn downwardly to the sleeve 12 when tubular nut 16 is rotated to secure the casing in place in connection with the valve tube.

The casing 15 is cylindrical in form, and is closed at one end 21 except for an opening 22 through which the externally projecting reduced extension 23 of the valve stem 24 is slidable.

The opposite end of the casing 15 is open for the reception of a cylindrical valve housing 25 and is provided with external threads at 26 around its said open end to receive a cap 27, the latter of which closes the open end of the casing in air-tight relation.

Within its chamber 18, the casing 15 has a reduced threaded portion at 28 into which the externally threaded inner end of the valve housing is screwed, and this inner end of the valve housing has a reduced opening 29 through which the valve stem extension 23 projects and forms a valve seat around its said opening 29 with which a circular valve disk 30 is adapted to cooperate.

The inner end of the valve housing just above mentioned is, in its effective position shown in Figure 1, disposed adjacent to the inner end of a radial channel 31 formed in the closed end 21 of casing 15, the outer end of which channel communicates with an internally threaded bore of the casing receiving the inner threaded end of a whistle tube 32 which forms the alarm member and communication between which and the tire valve tube 10 is normally cut off by valve 30, when the latter is held against its seat by proper pressure within the tire.

The valve housing 25 has a threaded end cap 33 at its outer end provided with a central opening 34 which normally places the interior of the valve housing in communication with the chamber 18 of the casing and thus in communication with the valve tube 10 of the tire, it being understood that the usual valve of the latter is removed when my invention is applied thereto.

Adjacent to the valve disk 30 the inner portion of the valve stem 24 passes through an apertured guide plate 35 which forms a bearing for the stem as well as a pressure adjusting member for the spring of the valve, this spring being indicated at 36 and being coiled around the stem 24 between the apertured plate 35 and an abutting member 37 carried by the outer end of the valve stem and held in place by a nut 38 on the outer extremity of the valve stem.

Adjacent to its upper bore receiving whistle tube 32, the casing 15 has a bore communicating by a channel 39 with its chamber 18 at a point diametrically opposite to the opening 19, the last mentioned bore being threaded for the reception of the inner threaded end of a laterally extending inflating tube 40, the latter of which has in its outer portion, the usual or any suitable internal valve 41 and threaded end cap 42.

The pressure at which the alarm as thus described will act is determined, and set by proper adjustment of the controlling spring 36 so that its pressure will act upon the valve 30 when the air pressure of the tire falls below the maximum pressure at which the alarm will operate. It is obvious therefore, that the alarm may be made to act at various pressures by simply adjusting the apertured plate 35, as described.

When the pressure does fall below the maximum pressure at which the alarm will act and the disk 30 is forced away from its seat against the inner end of the valve housing 25 by the pressure of spring 36, air finds its way from the tire valve tube 10, through the casing chamber 18 through opening 34 at the outer end of the valve housing and thence through opening 29 at the inner end of the valve housing to the channel 31 leading directly to the alarm member. The pressure thus utilized through the alarm member obviously quickly reduces pressure within the tire and to avoid exhaustion thereof, the valve stem 24 is so extended at its outer end with respect to the outer end of the valve housing, that as the valve and valve stem continue to move outwardly and spring 36 continues to exert increasingly greater pressure than that within the tire, the outer end of the valve tube or rather the nut 38 which may be formed of any suitable material comes into abutting relation with the cap 33 of the valve housing around the opening 34 and thus cuts off further outflow of air pressure. In this way, the alarm is made to act between maximum and minimum pressures, the former of which is set by adjustment of the spring at the pressure at which it is desired the alarm be sounded and the latter of which occurs at say five pounds pressure below the maximum pressure, so that the alarm will be sounded during the exhausting of the difference between the maximum and minimum pressures only. In this way complete exhaustion of the pressure within the tire is avoided.

In Figures 4 to 7 inclusive, I have shown a slightly different arrangement to bring about the same result, a vertically disposed cylindrical casing 15$^a$ being employed, connected by an extension 14$^a$ at its lower end to the valve tube 10$^a$ of a tire in substantially the same manner as previously described in connection with Figure 1.

In the lower portion of the casing 15$^a$ however, the pressure of the tire acts against a diaphragm 43 which is connected to the lower apertured end of an axially bored valve stem 24$^a$, to normally hold the valve disk 30$^a$ at the upper end of this stem in engagement with the lower wall 44 of an upper end cap 45 and around the opening 46 in said inner wall which leads to a radial bore connecting with an inflating tube 47. At one side of the casing 15$^a$ an alarm member 32$^a$ is connected in communicating relation with the casing chamber 18$^a$ through the latter of which the valve stem 24$^a$ is extended, and the valve stem has at its lower end a nut 38$^a$ which acts as a valve against the lower portion of the casing or extension 14$^a$ around its opening 19$^a$ so as to shut off further exhaust of air from the tire when the minimum pressure has been reached. The valve spring 36$^a$ is in this instance between the diaphragm 43 and an adjusting plate 35$^a$ threaded within the casing 15$^a$ and the parts are arranged so that the pressure of the tire acts against the diaphragm 43 to normally hold the valve disk 30$^a$ in closed position effectively preventing communication between the valve tube bore and the casing chamber 18$^a$ above the diaphragm 43.

When the pressure falls below the maximum pressure at which the alarm will act, spring 36$^a$ forces the valves stem downwardly and shifts valve disk 30$^a$ to the position shown in Figure 4, so that the pressure thus finds its way from the valve stem bore into the casing chamber 18$^a$ and thus into and through the whistle or alarm member 32$^a$. As the pressure thus exhausts through the whistle tube, spring 36$^a$ continues to force the valve and its stem downwardly until the nut 36$^a$ engages its seat around the opening 19$^a$ and thus cuts off further supply of air to the casing.

In both forms of the invention as described, it is obviously necessary that some means be provided to mechanically close the main valve in order that the tire may be again inflated without the sounding of the alarm. To this end, the form shown in Figures 1 to 3 inclusive proposes a cap or head 48 upon the outer end of the externally projecting valve stem extension 23 between which and the closed end of the casing 15, a suitable tool may be inserted to force the valve 30 to closed position against the tension of its springs 24.

In the form of Figures 4 to 7 inclusive, the valve closing member is in the nature of a plunger, more particularly a spring controlled externally projecting plunger 44, having a nut or head 50 at its outer end and having an inner enlarged portion 51. This plunger is mounted in a bore through the upper end cap 48 and is so disposed that its inner enlarged portion 50, normally below the valve 30ª as seen in Figure 4, may be forced upwardly by a tool interposed between the outer nut or head 50 and the end cap 45 to engage the valve 30ª and shift the latter upwardly to closed position when the tire is to be again inflated.

It will be observed that in both forms of my invention described above, provision is made for simple connection directly to the usual valve tube of a pneumatic tire. Inasmuch as this may be difficult in connection with some wheels, I have shown in Figure 8 a modified means of application to my invention which consists in the support of a casing, i. e., either casing 15 of the Figures 1 to 3 inclusive, or casing 15ª of Figures 4 to 7 inclusive, by means of clamps 52, to a rim 53 adjacent to the tire valve tube 54. In this case, the casing of the alarm is connected by a flexible or other tube 55 to the valve tube 54 as shown.

I claim:—

A low pressure alarm comprising a casing attachable to a source of pressure, an alarm member carried by the casing, a pair of valve members, a stem on which the valve members are carried, said casing having a pair of valve seats located at spaced points for the reception of said valve members, each controlling communication between the source of pressure and the said alarm member and toward one of which the respective valve member is shiftable when the other valve member is moved away from its seat, and a spring for shifting the valve stem to simultaneously move said valves, a pressure supply connection leading to the said casing, and means to close one of said valves against the tension of said spring, including an extension carried by the valve stem and projecting exteriorly of the casing, as described.

WALTER HENRY BROWN.

Witness:
LAURA E. HARTGE.